United States Patent
Lam et al.

(10) Patent No.: US 11,093,712 B2
(45) Date of Patent: Aug. 17, 2021

(54) USER INTERFACES FOR WORD PROCESSORS

(71) Applicant: INTERNATIONAL BUSINESS MACHINES CORPORATION, Armonk, NY (US)

(72) Inventors: Joseph Lam, Markham (CA); Trudy L. Hewitt, Cary, NC (US); James M. Moreno, Georgetown, TX (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 16/197,815

(22) Filed: Nov. 21, 2018

(65) Prior Publication Data
US 2020/0159823 A1    May 21, 2020

(51) Int. Cl.
  G06F 40/253    (2020.01)
  G06F 40/35     (2020.01)
  G06F 16/44     (2019.01)
  G06F 40/289    (2020.01)

(52) U.S. Cl.
  CPC ............ G06F 40/253 (2020.01); G06F 16/44 (2019.01); G06F 40/289 (2020.01)

(58) Field of Classification Search
  CPC .... G06F 40/253; G06F 40/289; G06F 40/211; G06F 40/232; G06K 9/00402
  See application file for complete search history.

(56) References Cited

U.S. PATENT DOCUMENTS

| | | | |
|---|---|---|---|
| 10,594,757 B1* | 3/2020 | Shevchenko | G06F 40/253 |
| 2016/0092433 A1 | 3/2016 | Gluck et al. | |
| 2016/0306787 A1 | 10/2016 | Kinder | |
| 2016/0321243 A1* | 11/2016 | Walia | G06F 16/322 |
| 2017/0132205 A1 | 5/2017 | Novitskiy et al. | |
| 2019/0188258 A1* | 6/2019 | Bax | H04L 51/20 |

FOREIGN PATENT DOCUMENTS

WO    2014036827 A1    3/2014

OTHER PUBLICATIONS

Mell et al., "The NIST Definition of Cloud Computing", Recommendations of the National Institute of Standards and Technology, NIST Special Publication 800-145, Sep. 2011, 7 pages.

(Continued)

*Primary Examiner* — Thomas H Maung
(74) *Attorney, Agent, or Firm* — Anthony M. Pallone

(57) ABSTRACT

An embodiment of the invention may include a method, computer program product and system for communicating information to a user via a graphical user interface of a computer. An embodiment may include displaying a visual cue corresponding to a suggestion for text substitution within a text representation of a media file, wherein the suggestion for text substitution is generated in response to identification of any one or combination of a repeated word, a repeated phrase, and a filler, and wherein the suggestion for text substitution is based on an aggregation of one or more of characteristics of the text representation of the media file.

18 Claims, 5 Drawing Sheets

(56) References Cited

OTHER PUBLICATIONS

Lepki, "Find Repeated Words and Phrases, Why You Need to Weed Out Repetition in Your Writing", Jun. 17, 2018, pp. 1-9, https://prowritingaid.com/art/13/Find-repeated-words-and-phrases.aspx.

Liu, "ProWritingAid Checks for Clarity, Repeat Words, and Cliched Phrases", Lifehacker, Jan. 28, 2015, 2 pages.

Neon—Nederlands Online, "TextSTAT—Simple Text Analysis Tool", printed Aug. 15, 2018, pp. 1-3, http://neon.niederlandistik.fu-berlin.de/en/textstat/.

The Editorium™, "Program Add-ins for Microsoft Word", printed Aug. 15, 2018, pp. 1-14, http://www.editorium.com/.

Wyatt, "Automatically Identifying Repeated Words", Microsoft Word, Sep. 15, 2017, pp. 1-5, (https://wordribbon.tips.net/T011362_Automatically_Identifying_form-hd).

Microsoft, "Find and replace text", printed Aug. 15, 2018, pp. 1-3, https://support.office.com/en-us/article/Find-and-replace-text-or-other-items-50b45f26-c4b8-4003-b9e4-315a3547f69c.

* cited by examiner

USER INTERFACES FOR WORD PROCESSORS

BACKGROUND

Embodiments of the present invention relate generally to the fields of natural language processing and natural language understanding, and more specifically, to dynamic detection and cognitive replacement for repetitive groups of one or more words.

Natural language processing (NLP) is a subfield of computer science, information engineering, and artificial intelligence concerned with interactions between computers and human languages. NLP seeks to enable computers to process, interpret, and manipulate large amounts of human (natural) language data. Several language-processing techniques, such as hard coded rules-based methods, statistical modeling, and algorithmic machine-learning approaches, may be utilized in NLP in order to interpret human language. Basic NLP tasks include tokenization and parsing, lemmatization/stemming, word segmentation, part-of-speech tagging, speech recognition, text-to-speech, and identification of semantic relationships.

Natural language understanding (NLU) is a subtopic of natural language processing that deals with machine reading comprehension. NLU goes beyond the structural understanding of language to interpret intent, resolve context and word ambiguity, and generate well-formed human language. NLU can be applied to a diverse set of computer applications, ranging from small, relatively simple tasks such as short commands issued to robots, to highly complex tasks such as the full comprehension of newspaper articles or poetry passages.

BRIEF SUMMARY

An embodiment of the invention may include a method, computer program product and system for communicating information to a user via a graphical user interface of a computer. An embodiment may include displaying a visual cue corresponding to a suggestion for text substitution within a text representation of a media file, wherein the suggestion for text substitution is generated in response to identification of any one or combination of a repeated word, a repeated phrase, and a filler, and wherein the suggestion for text substitution is based on an aggregation of one or more of characteristics of the text representation of the media file.

DETAILED DESCRIPTION

Figure 1:
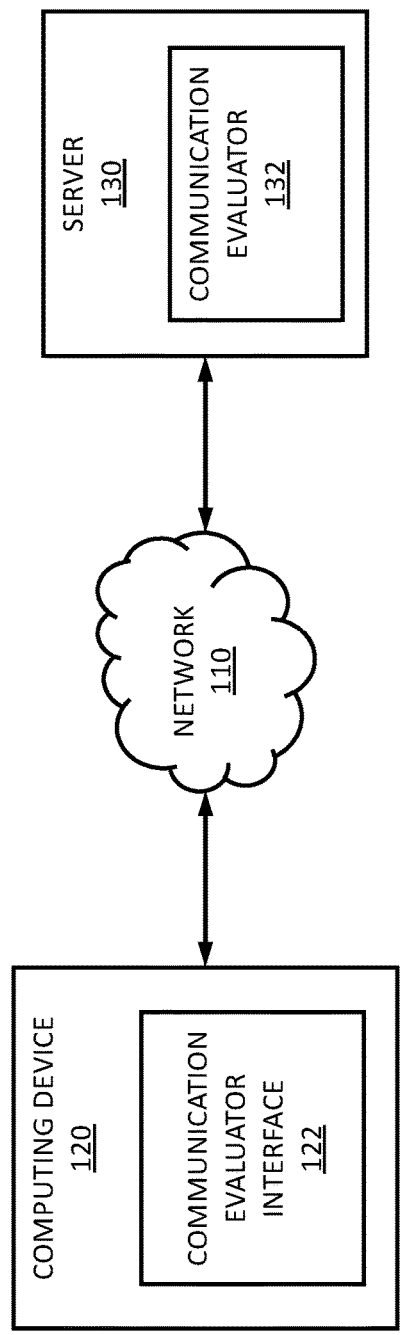
FIG. 1 is a block diagram illustrating a repeated word detection system, in accordance with an embodiment of the present invention.

The implementation of text analytics, also referred to as text data mining, is closely related to the operation of natural language processing and natural language understanding. Text analytics is the process of extracting structure and meaning from large volumes of content through linguistic, statistical, and machine-learning techniques. Typically, text analysis involves structuring the input text, deriving patterns within the structured data, and evaluating/interpreting the output. Common tasks of text analytics include text categorization, text clustering, concept/entity extraction, production of granular taxonomies, sentiment analysis, document summarization, and entity relation modeling. Text analysis also involves information retrieval, lexical analysis to study word frequency distributions, pattern recognition, tagging/annotation of data, and predictive analytics. Through the implementation of text analytics, text may be turned into data for analysis via application of natural language processing.

While, technologies such as natural language processing and text analytics help computers to communicate with humans, these technologies may also help humans to better communicate with each other. The complexity and diversity of human languages allow people to express themselves in many ways, both verbally and in writing. Within each language there is a unique set of grammar and syntax rules, terms, and slang. Moreover, as humans communicate with each other using these sets of grammar and syntax rules, terms, and slang, individual styles and patterns of communication may develop which may improve or impede the effectiveness (i.e., the ability to relay information which gets a point across) of one's communication. For example, when an individual speaks or writes, he or she may often repeat words and phrases. The effect of such repetition may be to confuse the listener or reader, clutter the individual's speech or writing, and reduce the effectiveness of the individual's communication. As another example, an individual may be a veteran employee within a company and may, due to his/her years of service in the industry, be the go-to person for knowledge sharing. This experienced and knowledgeable individual may enjoy sharing his/her expertise in the form of written articles and conference calls. However, his/her articles and lectures are often considered ineffective as they are overshadowed by his/her laborious writing style, poor word choices, and excessive use of filler words in speech.

In an effort to promote the effectiveness of a given digital media file communication (e.g., textual file, audio file, visual file, or a combination of these fomats), embodiments of the present invention may include a repeated word detection (RWD) system 100, described below, which provides a method for detecting and evaluating problematic language such as duplicated words, duplicated phrases, and/or fillers in a given media file. RWD system 100 may also provide suggested substitutions for the detected problematic language based on the context in which it is being used within the given communication. Additionally, RWD system 100 may communicate the problematic language and the suggested substitutions to a user via a graphical user interface. As part of its operation, RWD system 100 may leverage cognitive technology to analyze the context of the detected problematic language, along with the communication style of the writer/speaker, and the desired tone/mood of the communication in order to provide appropriate substitutions for the detected words, phrases, and/or fillers. The result of implementing RWD system 100 may be a more effective article, speech, audio or video recording, in line with the context in which the communication is being delivered. For instance, RWD system 100 may increase the effectiveness of a communication by improving the conciseness of the communication. In another instance, the application of RWD system 100 to audio recordings may assist with conditions such as Palilalia, Stuttering, and Obsessive Compulsive Disorder, where individuals have involuntary repetition of syllables, words, and/or phrases.

Embodiments of the present invention will now be described in detail with reference to the accompanying Figures.

FIG. 1 is a functional block diagram illustrating repeated word detection system 100, in accordance with an embodiment of the present invention. In an example embodiment, RWD system 100 may include computing device 120 and server 130, interconnected via network 110.

In various embodiments, network 110 is a communication channel capable of transferring data between connected devices. In an example embodiment, network 110 may be the Internet, representing a worldwide collection of networks and gateways to support communications between devices connected to the Internet. Moreover, network 110 may include, for example, wired, wireless, or fiber optic connections which may be implemented as an intranet network, a local area network (LAN), a wide area network (WAN), or any combination thereof. In further embodiments, network 110 may be a Bluetooth network, a WiFi network, or a combination thereof. In general, network 110 can be any combination of connections and protocols that will support communications between computing device 120 and server 130.

In an example embodiment, computing device 120 may include communication evaluator interface 122. Computing device 120 may be a laptop computer, a notebook, a tablet computer, a netbook computer, a personal computer (PC), a desktop computer, a personal digital assistant (PDA), a smart phone, a wearable computing device, or any other electronic device or computing system capable of sending, and receiving data to and from other computing devices such as server 130, via network 110, and capable of supporting the functionality required of embodiments of the invention. For example, computing device 120 may support a communication link (e.g., wired, wireless, direct, via a LAN, via the network 110, etc.) between computing device 120 and server 130. In an embodiment, computing device 120 may be a mobile electronic device (e.g. a smart phone, a laptop, a wearable computing device) or computing system capable of sending and receiving data to and from other computing devices such as server 130, via network 110, and capable of supporting the functionality required of embodiments of the invention. For example, a user may compose a digital media file (e.g., written article, speech, audio or video recording), via computing device 120, for distribution to others via network 110. Data (e.g., media file) sent from and/or received by computing device 120 may include text data, audio recordings, video recordings, or any combination thereof. Computing device 120 may be described, generally, with respect to FIG. 3 below. In an example embodiment, computing device 120 may be a laptop used by an individual to compose a written communication intended for distribution to others via network 110.

In an example embodiment, communication evaluator interface 122 may be a program, or subroutine contained in a program, that may operate as a graphic user interface to ingest and parse a given media file (e.g., written article, speech, audio or video recording) in order to identify repeated words, repeated phrases, fillers (i.e., a sound, word, or phrase used to fill pauses in speaking), or any combination thereof. Communication evaluator interface 122 may also operate to transmit data such as, the ingested media file, the parsed output, and any identified repeated words, repeated phrases, fillers, or any combination thereof to another computing device (e.g., server 130). Data transmitted by communication evaluator interface 122 may include text data, audio recordings, video recordings, or any combination thereof. As part of its operation, communication evaluator interface 122 may utilize any commercially available, open source, or proprietary speech-to-text or text-to-speech programs that facilitate the functionality of communication evaluator interface 122, in accordance with embodiments of the invention program. Furthermore, communication evaluator interface 122 may utilize known methods and technologies for identifying repeated words, repeated phrases, fillers, or any combination thereof.

In an example embodiment, communication evaluator interface 122 may parse a media file composed on computing device 120 and identify problematic language (i.e., one or more repeated words, repeated phrases, fillers, or any combination thereof) within the media file. Additionally, in an example embodiment, communication evaluator interface 122 may transmit, via computing device 120 and network 110, the communication, the parsed output, and any identified repeated words, repeated phrases, fillers, or any combination thereof to server 130. Furthermore, in an example embodiment, communication evaluator interface 122 may receive data from communication evaluator 132, described below, and display the received data to the user via a graphical user interface. The received data may include recommended substitutions generated by communication evaluator 132 in response to problematic language identified by communication evaluator interface 122 within the media file. While communication evaluator interface 122 is shown as part of computing device 120, in other embodiments, communication evaluator interface 122 may be shown as part of server 130 or may be integrated with communication evaluator 132, described below, contained within server 130.

In an example embodiment, server 130 may include communication evaluator 132. Server 130 may be a desktop computer, a notebook, a laptop computer, a blade server, a networked computer appliance, a virtual device, or any other networked electronic device or computing system capable of receiving and sending data from and to other computing devices such as computing device 120, via network 110, and capable of supporting the functionality required of embodiments of the invention. In an example embodiment, server 130 may function to process, via communication evaluator 132, data received from computing device 120, via network 110. While server 130 is shown as a single device, in other embodiments, server 130 may be comprised of a cluster or plurality of computing devices, working together or working separately. Server 130 may be described generally with respect to FIG. 3 below.

In an example embodiment, communication evaluator 132 may be a program, or subroutine contained in a program, that may operate to process data received from communication evaluator interface 122. In processing the received data, communication evaluator 132 may leverage cognitive computing to generate intelligent suggestions for substitution of any repeated words, repeated phrases, fillers, or any combination thereof, identified by communication evaluator interface 122. The suggested substitutions may be based on analysis and aggregation of factors including, but not limited to, the context of the words and/or phrases that are being replaced, the communication style of the writer/speaker (e.g., a user's writing style and/or style of speaking), and the desired mood and tone of the final message. Communication evaluator 132 may suggest and/or implement the substitutions in order to promote the effectiveness of the communication being delivered while maintaining consistency with the mood, tone, and goal of the original communication. Moreover, in situations where the given communication is an audio/video file, communication evaluator 132 may also suggest and/or implement inflections to ensure that substitutions within the audio/video file maintain consistency with the mood, tone, and goal of the original communication. In an example embodiment, communication evaluator 132 leverages cognitive computing to generate and suggest one or more substitutions for the one or more repeated words, repeated phrases, fillers, or any combination thereof, as identified by communication evaluator interface 122 within the media file composed on computing device 120. Furthermore, in an example embodiment, communication evaluator 132 may transmit, via server 130 and network 110, the generated substitutions to communication evaluator interface 122 for display to the user. The operations and functions of communication evaluator 132 are described in further detail below with regard to FIG. 2. While communication evaluator 132 is shown as part of server 130, in other embodiments, communication evaluator 132 may be shown as part of computing device 120.

Figure 2:
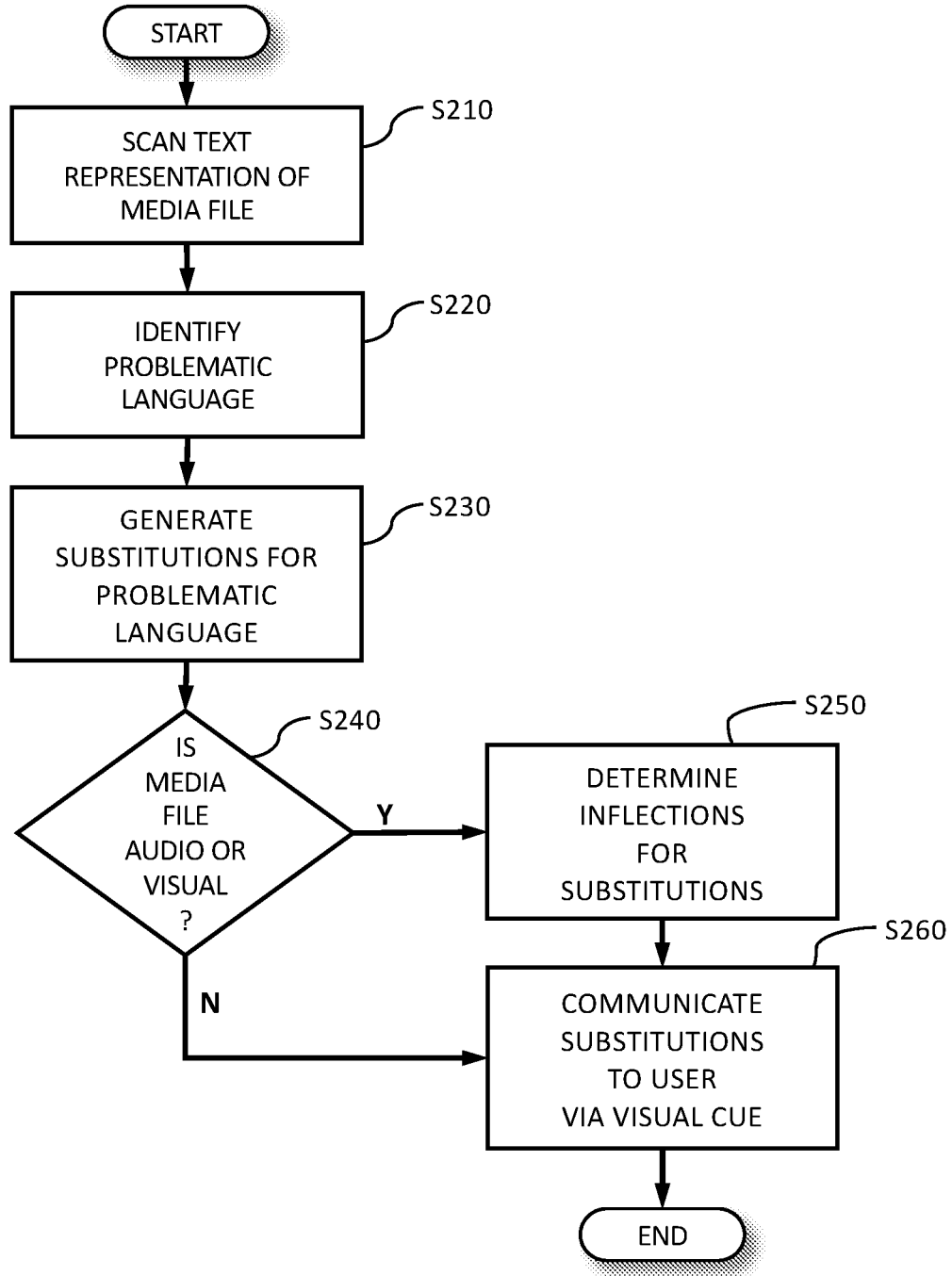
FIG. 2 is a flowchart illustrating the operations of the communication evaluator of FIG. 1, in accordance with an embodiment of the invention.

FIG. 2 shows a flowchart illustrating the operations of communication evaluator 132 in accordance with an example embodiment of the invention. Referring to step S210, communication evaluator 132 may receive, from communication evaluator interface 122, data associated with a media file. The media file may have been composed by a user of computing device 120 and may be in a text format, an audio format, a visual format, or any combination of these formats. Moreover, the media file may be scanned by communication evaluator interface 122 in order to produce a parsed output of the media file and/or a textual representation of the media file. For example, if the composed media file is in an audio format, the scan may implement known methods of speech to text processing in order to produce a textual representation of the media file. The data received by communication evaluator 132 may include the originally composed media file, parsed output of the media file, a textual representation of the media file, or any combination thereof. In another embodiment of the present invention, the scanned output, as performed by communication evaluator interface 122, may also include identification of problematic language such as words and phrases that are repeated in the media file, in addition to fillers within the media file. In an example embodiment, communication evaluator 132 may receive a media file, originally composed in text format, from communication evaluator interface 122.

Referring to step S220, communication evaluator 132 may analyze the data received in step S210 in order to identify problematic language within the received data. In an embodiment of the present invention, problematic language within the media file may include repeated words, repeated phrases, fillers, or any combination thereof. In another embodiment, problematic language may further include misspelled words and/or improper usage of words which may negatively impact comprehension and desired sentiment of the media file. Lists of misspelled and/or improperly used words may be accessible to communication evaluator 132 via the internet. Additionally, usage of a word and/or phrase may be considered proper if it conforms to a predefined set of grammatic and/or linguistic rules. Any use of a word and/or phrase that does not conform to the rules may be considered improper. In another embodiment, problematic language may further include repetitively used and/or improperly used grammar and/or images within the media file such as punctuation and/or emojis. In yet another embodiment, problematic language may further include the use of redundant phrases within the media file, notwithstanding the use of different wording among the redundant phrases. In embodiments of the present invention, communication evaluator 132 may exclude the use of proper names from identification of problematic language within the media file. Furthermore, in embodiments of the present invention, communication evaluator 132 may leverage known techniques for identification of repeated words, repeated phrases, and fillers within the media file. In an example embodiment, communication evaluator 132 may analyze the text media file received in step S210 and identify problematic language including repeated words, repeated phrases, and fillers.

Referring to step S230, communication evaluator 132 may generate substitutions (e.g., substitute text) in response to the problematic language identified in step S220. In generating the substitutions, communication evaluator 132 may leverage cognitive technology, natural language processing, and text analytics to analyze and/or determine one or more characteristics of the received media file communication. Such characteristics of the received media file may include, but are not limited to, context of the overall communication, context of the identified problematic language, length of the communication, style of the writer and/or speaker (i.e., the composer of the media file) of the communication, general mood and tone of the communication, overall goal of the communication, or any combination thereof. In determining the context of the identified problematic language, communication evaluator 132 may, in embodiments of the present invention, evaluate metrics of the communication such as lexical semantics of the communication, the time of the communication, the placement of the problematic language within the communication, and the length of the communication. In determining the style of the writer and/or speaker of the communication, communication evaluator 132 may, in embodiments of the present invention, leverage existing software tools which apply methods of stylometry to a given media file. In determining the general mood, tone, and goal of the overall communication (e.g., to inform, to persuade, to argue), communication evaluator 132 may, in embodiments of the present invention, leverage software tools which apply linguistic analysis to detect emotional and language tones in written text. For example, communication evaluator 132 may leverage the IBM Watson™ Tone Analyzer service which can analyze tone at both the document and sentence levels. Based on an aggregation of the determined characteristics above, communication evaluator 132 may, in embodiments of the present invention, provide recommendations and suggestions on substitute language for the identified problematic language. In an example embodiment, communication evaluator 132 may generate substitutions in response to the repeated words, repeated phrases, and fillers identified in step S220. The generated substitutions may be based on an aggregation of determined characteristics of the text media file received in step S210 including context of the overall text media file, context of the identified problematic language, length of the text media file, style of the writer of the text media file, general mood and tone of the text media file, and overall goal of the text media file.

Referring to step S240, communication evaluator 132 may determine if the original media file received in step S210 an audio vile or a visual file. If it is determined that the original media file is either audio or visual, communication evaluator 132 proceeds to step S250. If it is determined that the original media file is not audio or visual, communication evaluator 132 proceeds to step S260. In an example embodiment, communication evaluator 132 determines that the media file received in step S210 was originally composed in text format and proceeds to step S260.

Referring to step S250, communication evaluator 132 may determine one or more inflections for the recommended substitutions generated in step S230. The determined inflections may be based on an aggregation of characteristics of the text media file determined in step S230. In doing so, communication evaluator 132 may ensure that the recommended substitutions maintain the mood and tone of the original media file. In an embodiment of the present invention, determined inflections may be expressed to the user in the form of a visual cue displayed via a graphical user interface.

Referring to step S260, communication evaluator 132 may communicate the identified problematic language and the recommended substitutions to the user via the display, in a graphical user interface, of visual cues corresponding to the recommended substitutions for the problematic language within the media file. In embodiments of the present invention, the displayed visual cues may include, but are not limited to, any one or combination of a changed font color, highlighted text, an icon, underlined text, a symbol, and a character. In addition to alerting the user to the recommended substitutions, the displayed visual cues may also alert the user to the impact of the communication if a particular recommendation is implemented within the media file. For example, in a media file where the word &should8 is substituted with &need8 in a sentence, communication evaluator 132 may provide a visual cue that this change will strengthen the directive voice of the sentence. In an example embodiment, communication evaluator 132 may communicate the problematic language identified in step S220 and the recommended substitutions generated in step 230 to the user via the display, in a graphical user interface on computing device 120, of visual cues corresponding to each of the recommended substitutions for the problematic language within the media file received in step S210. In an alternate embodiment, the visual cue provided by communication evaluator 132 may be integrated within an electronic presentation environment. For example, if during a presentation communication evaluator 132 identifies that the user is repeating certain words, communication evaluator 132 may provide for a small pop-up dialog box displayed to the user or for a light flashing icon displayed in the task bar which may remind the user to slow down and not to use the identified repeated word or words.

Figure 3:
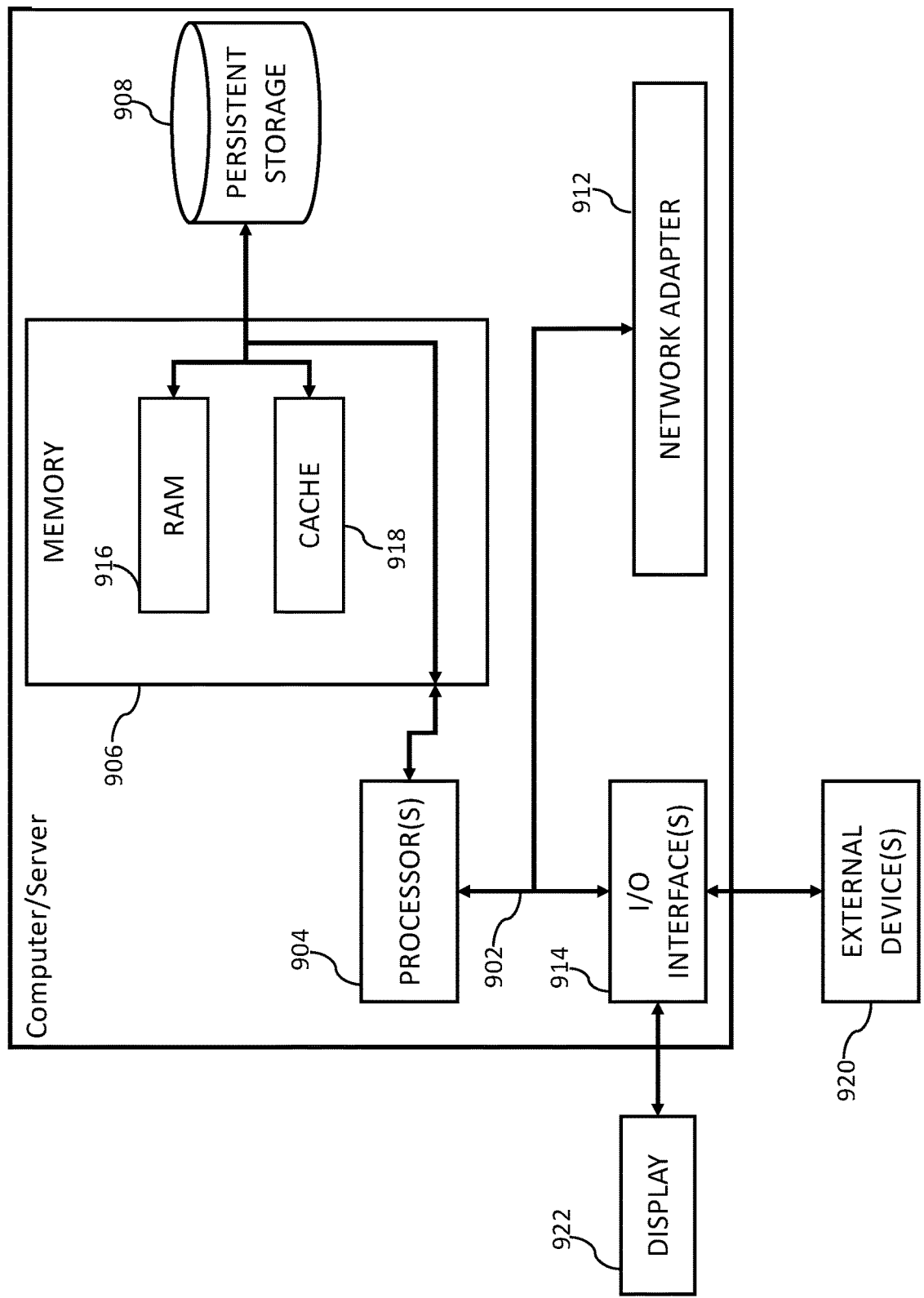
FIG. 3 is a block diagram depicting the hardware components of the repeated word detection system of FIG. 1, in accordance with an embodiment of the invention.

FIG. 3 depicts a block diagram of components of computing device 120 and server 130, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 120 and server 130 include communications fabric 902, which provides communications between computer processor(s) 904, memory 906, persistent storage 908, network adapter 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs communication evaluator interface 122 in computing device 120; and communication evaluator 132 in server 130 are stored in persistent storage 908 for execution by one or more of the respective computer processor(s) 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Network adapter 912, in these examples, provides for communications with other data processing systems or devices. In these examples, network adapter 912 includes one or more network interface cards. Network adapter 912 may provide communications through the use of either or both physical and wireless communications links. The programs communication evaluator interface 122 in computing device 120; and communication evaluator 132 in server 130 may be downloaded to persistent storage 908 through network adapter 912.

I/O interface(s) 914 allows for input and output of data with other devices that may be connected to computing device 120 and server 130. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., programs communication evaluator interface 122 in computing device 120; and communication evaluator 132 in server 130, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While steps of the disclosed method and components of the disclosed systems and environments have been sequentially or serially identified using numbers and letters, such numbering or lettering is not an indication that such steps must be performed in the order recited and is merely provided to facilitate clear referencing of the method's steps. Furthermore, steps of the method may be performed in parallel to perform their described functionality.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
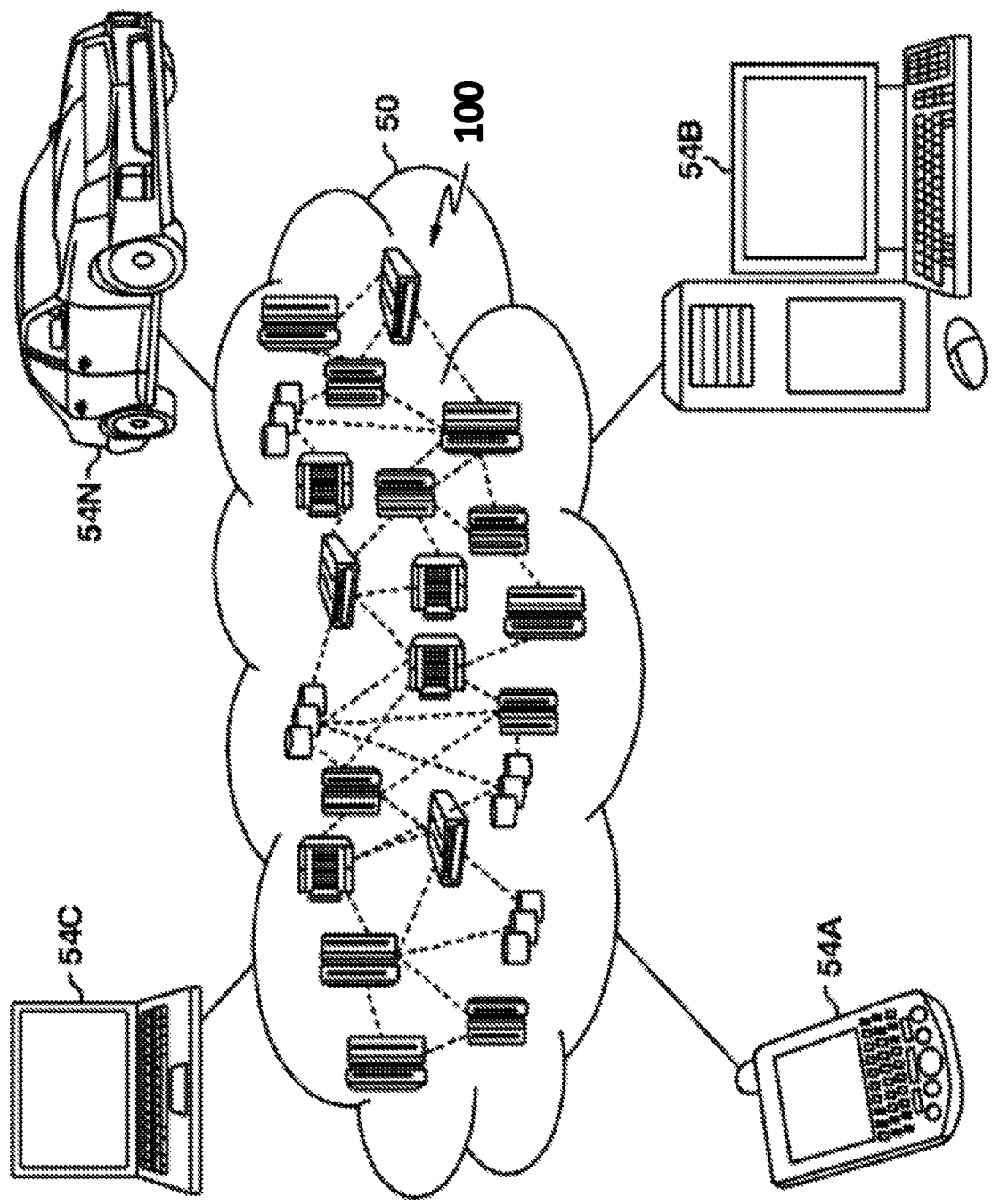
FIG. 4 depicts a cloud computing environment in accordance with an embodiment of the present invention.

Referring now to FIG. 4, illustrative cloud computing environment 50 is depicted. As shown, cloud computing environment 50 includes one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
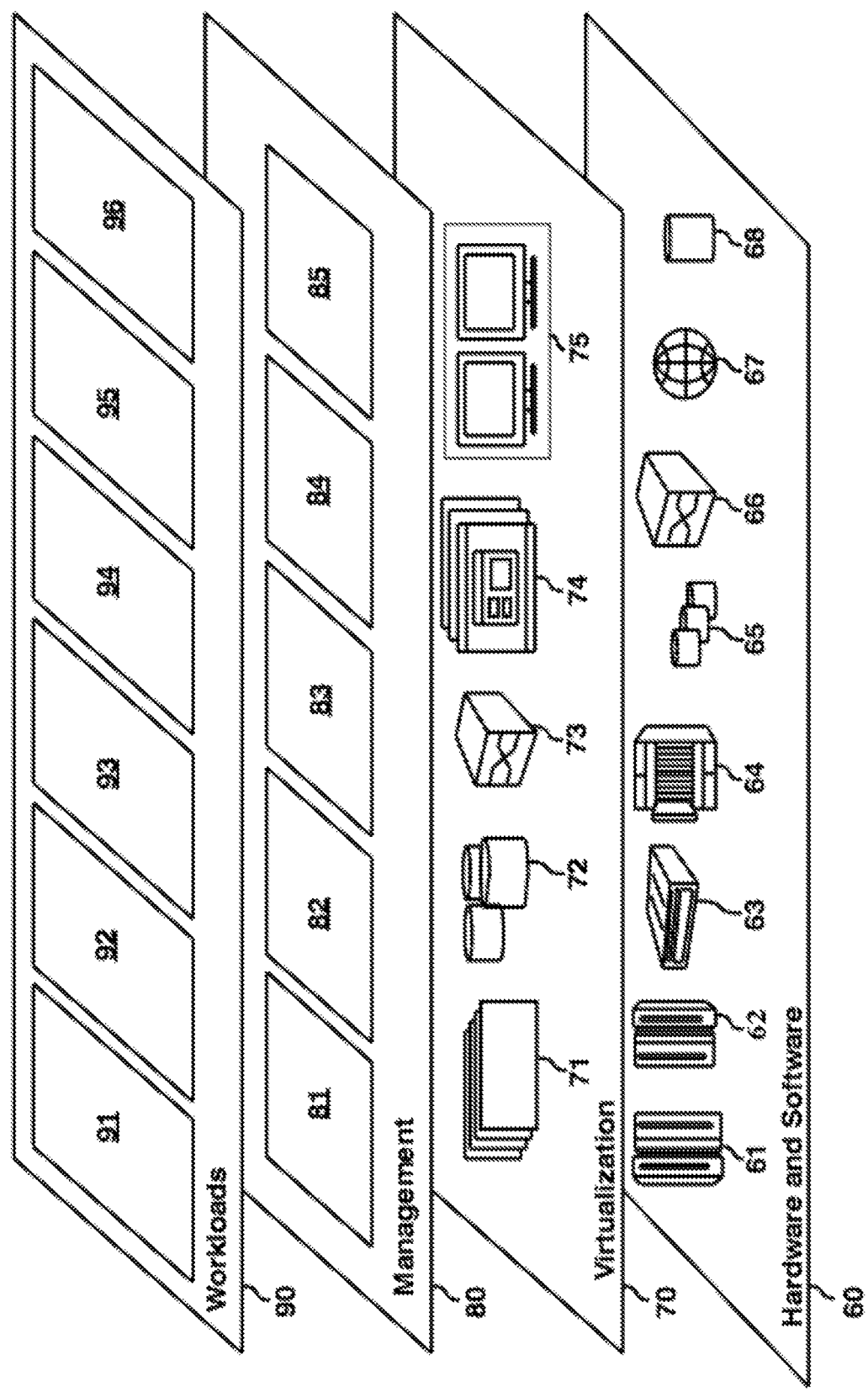
FIG. 5 depicts abstraction model layers in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and repeated word detection system 96. Repeated word detection system 96 may relate to detecting repeated words, repeated phrases, and/or fillers within a textual representation of a communication and displaying substitutions, via visual cues in a graphical user interface, for the detected words, phrases, and/or fillers based on cognitive analysis and natural language processing of the textual representation of the communication.

The descriptions of the various embodiments of the present invention have been presented for purposes of illustration, but are not intended to be exhaustive or limited to the embodiments disclosed. The terminology used herein was chosen to explain the principles of the one or more embodiments, the practical application or technical improvement over technologies found in the marketplace, or to enable others of ordinary skill in the art to understand the embodiments. Various modifications, additions, substitutions, and the like will be apparent to those of ordinary skill in the art without departing from the scope and spirit of the invention, as defined in the following claims.

What is claimed is:

1. A method for communicating information to a user via a graphical user interface of a computer, the method comprising:
   displaying a visual cue identifying a problem language comprising any one or combination of a repeated word, a repeated phrase, a filler, an improper use of grammar, and a repeated use of grammar and providing a corresponding suggestion for text substitution within a text representation of a media file, wherein the suggestion for text substitution is generated in response to identification of any one or combination of a repeated word, a repeated phrase, a filler, an improper use of grammar, and a repeated use of grammar, and wherein the suggestion for text substitution is based on an aggregation of one or more of characteristics of the text representation of the media file, and wherein the suggestion for text substitution maintains a tone of the text representation of the media file, and wherein the visual cue alerts the user to an impact on the text representation if the suggestion for text substitution is implemented, and wherein the visual cue comprises a changed font color, underlined text, and an icon;
   determining an inflection of the suggestion for text substitution; wherein the inflection maintains a tone of the text representation of the media file;
   based on determining that the media file comprises any one or combination of an audio file and a video file, displaying a visual cue corresponding to a recommended inflection for the suggested text substitution; and
   generating a suggestion for grammar substitution within the text representation of the media file in response to identification of any one or combination of an improper use of grammar and a repeated use of grammar, wherein the identified any one or combination of the improper use of grammar and the repeated use of grammar comprises any one or combination of an improper use of images and a repeated use of images within the media file, and wherein the images within the media file comprise emojis, and wherein the suggestion for grammar substitution is based on an aggregation of the one or more of characteristics of the text representation of the media file.

2. The method of claim 1, wherein the characteristics of the text representation of the media file comprise any one or combination of a context of the overall media file, a context of problematic language identified within the media file, a length of the media file, media file composer style, a general tone of the media file, and an overall goal of the media file.

3. The method of claim 1, wherein the characteristics of the text representation of the media file are determined via technologies comprising any one or combination of natural language processing, text analytics, linguistic analysis, and stylometry.

4. The method of claim 1,
   wherein the recommended inflection for the suggested text substitution maintains a tone of the text representation of the media file, and wherein the recommended inflection is based on an aggregation of the one or more of characteristics of the text representation of the media file.

5. The method of claim 1, further comprising:
   generating the suggestion for text substitution in response to identification of any one or combination of an improper use of a word and an improper use of a phrase.

6. The method of claim 1, further comprising:
   integrating display of the visual cue corresponding to the suggestion for text substitution within an electronic presentation environment utilized by the user on the computer.

7. The method of claim 1, further comprising:
   generating the suggestion for text substitution in response to identification of use of a redundant phrase.

8. A computer program product for communicating information to a user via a graphical user interface of a computer, the computer program product comprising:
   one or more computer-readable tangible storage devices and program instructions stored on at least one of the one or more computer-readable tangible storage devices, the program instructions comprising:

program instructions to display a visual cue identifying a problem language comprising any one or combination of a repeated word, a repeated phrase, a filler, an improper use of grammar, and a repeated use of grammar and providing a corresponding suggestion for text substitution within a text representation of a media file, wherein the suggestion for text substitution is generated in response to identification of any one or combination of a repeated word, a repeated phrase, a filler, an improper use of grammar, and a repeated use of grammar, and wherein the suggestion for text substitution is based on an aggregation of one or more of characteristics of the text representation of the media file, and wherein the suggestion for text substitution maintains a tone of the text representation of the media file, and wherein the visual cue alerts the user to an impact on the text representation if the suggestion for text substitution is implemented, and wherein the visual cue comprises a changed font color, underlined text, and an icon;

program instructions to determine an inflection of the suggestion for text substitution; wherein the inflection maintains a tone of the text representation of the media file;

based on determining that the media file comprises any one or combination of an audio file and a video file, program instructions to display a visual cue corresponding to a recommended inflection for the suggested text substitution; and program instructions to generate a suggestion for grammar substitution within the text representation of the media file in response to identification of any one or combination of an improper use of grammar and a repeated use of grammar, wherein the identified any one or combination of the improper use of grammar and the repeated use of grammar comprises any one or combination of an improper use of images and a repeated use of images within the media file, and wherein the images within the media file comprise emojis, and wherein the suggestion for grammar substitution is based on an aggregation of the one or more of characteristics of the text representation of the media file.

9. The computer program product of claim 8, wherein the characteristics of the text representation of the media file comprise any one or combination of a context of the overall media file, a context of problematic language identified within the media file, a length of the media file, media file composer style, a general tone of the media file, and an overall goal of the media file.

10. The computer program product of claim 8, wherein the characteristics of the text representation of the media file are determined via technologies comprising any one or combination of natural language processing, text analytics, linguistic analysis, and stylometry.

11. The computer program product of claim 8, wherein the recommended inflection for the suggested text substitution maintains a tone of the text representation of the media file, and wherein the recommended inflection is based on an aggregation of the one or more of characteristics of the text representation of the media file.

12. The computer program product of claim 8, further comprising:

program instructions to generate the suggestion for text substitution in response to identification of any one or combination of an improper use of a word and an improper use of a phrase.

13. The computer program product of claim 8, further comprising:

program instructions to integrate display of the visual cue corresponding to the suggestion for text substitution within an electronic presentation environment utilized by the user on the computer.

14. A computer system for communicating information to a user via a graphical user interface of a computer, the computer system comprising:

one or more processors, one or more computer-readable memories, one or more computer-readable tangible storage devices, and program instructions stored on at least one of the one or more computer-readable tangible storage devices for execution by at least one of the one or more processors via at least one of the one or more memories, the program instructions comprising:

program instructions to display a visual cue identifying a problem language comprising any one or combination of a repeated word, a repeated phrase, a filler, an improper use of grammar, and a repeated use of grammar and providing a corresponding suggestion for text substitution within a text representation of a media file, wherein the suggestion for text substitution is generated in response to identification of any one or combination of a repeated word, a repeated phrase, a filler, an improper use of grammar, and a repeated use of grammar, and wherein the suggestion for text substitution is based on an aggregation of one or more of characteristics of the text representation of the media file, and wherein the suggestion for text substitution maintains a tone of the text representation of the media file, and wherein the visual cue alerts the user to an impact on the text representation if the suggestion for text substitution is implemented, and wherein the visual cue comprises a changed font color, underlined text, and an icon;

program instructions to determine an inflection of the suggestion for text substitution; wherein the inflection maintains a tone of the text representation of the media file;

based on determining that the media file comprises any one or combination of an audio file and a video file, program instructions to display a visual cue corresponding to a recommended inflection for the suggested text substitution; and program instructions to generate a suggestion for grammar substitution within the text representation of the media file in response to identification of any one or combination of an improper use of grammar and a repeated use of grammar, wherein the identified any one or combination of the improper use of grammar and the repeated use of grammar comprises any one or combination of an improper use of images and a repeated use of images within the media file, and wherein the images within the media file comprise emojis, and wherein the suggestion for grammar substitution is based on an aggregation of the one or more of characteristics of the text representation of the media file.

15. The computer system of claim 14, wherein the characteristics of the text representation of the media file comprise any one or combination of a context of the overall media file, a context of problematic language identified within the media file, a length of the media file, media file composer style, a general tone of the media file, and an overall goal of the media file.

16. The computer system of claim 14, wherein the characteristics of the text representation of the media file are determined via technologies comprising any one or combination of natural language processing, text analytics, linguistic analysis, and stylometry.

17. The computer system of claim 14,
wherein the recommended inflection for the suggested text substitution maintains a tone of the text representation of the media file, and wherein the recommended inflection is based on an aggregation of the one or more of characteristics of the text representation of the media file.

18. The computer system of claim 14, further comprising:
program instructions to integrate display of the visual cue corresponding to the suggestion for text substitution within an electronic presentation environment utilized by the user on the computer.

* * * * *